United States Patent
Roxworthy et al.

(10) Patent No.: US 11,372,105 B1
(45) Date of Patent: Jun. 28, 2022

(54) FMCW LIDAR USING ARRAY WAVEGUIDE RECEIVERS AND OPTICAL FREQUENCY SHIFTING

(71) Applicant: AEVA, INC., Mountain View, CA (US)

(72) Inventors: Brian J. Roxworthy, San Jose, CA (US); Pradeep Srinivasan, Fremont, CA (US); Ashwin Samarao, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/495,665

(22) Filed: Oct. 6, 2021

(51) Int. Cl.
  *G01S 17/32* (2020.01)
  *G01S 7/4913* (2020.01)
  *G01S 7/481* (2006.01)

(52) U.S. Cl.
  CPC ............ *G01S 17/32* (2013.01); *G01S 7/4913* (2013.01); *G01S 7/4817* (2013.01)

(58) Field of Classification Search
  None
  See application file for complete search history.

(56) References Cited

U.S. PATENT DOCUMENTS

| | | | | |
|---|---|---|---|---|
| 9,559,483 B2 * | 1/2017 | Fermann | ........... | H01S 3/094019 |
| 2004/0145801 A1 * | 7/2004 | Rice | ...................... | H01S 3/2383 |
| | | | | 359/349 |
| 2006/0203224 A1 * | 9/2006 | Sebastian | ................. | G01C 3/08 |
| | | | | 356/4.09 |
| 2015/0346340 A1 * | 12/2015 | Yaacobi | ................ | G01S 7/4915 |
| | | | | 356/5.11 |
| 2018/0364336 A1 * | 12/2018 | Hosseini | ............... | G01S 7/4817 |
| 2020/0088878 A1 * | 3/2020 | Talty | ..................... | G01S 7/4813 |

FOREIGN PATENT DOCUMENTS

| KR | 20210042354 A | * | 4/2021 | ........... G01S 17/894 |
|---|---|---|---|---|
| WO | WO-2020219145 A1 | * | 10/2020 | ........... G02B 6/2746 |

OTHER PUBLICATIONS

English version of KR 20210042354 A (Year: 2021).*

\* cited by examiner

*Primary Examiner* — Yuqing Xiao
*Assistant Examiner* — Jempson Noel
(74) *Attorney, Agent, or Firm* — Womble Bond Dickinson (US) LLP

(57) ABSTRACT

A system including one or more waveguides to receive a first returned reflection having a first lag angle and generate a first waveguide signal, receive a second returned reflection having a second lag angle different from the first lag angle, and generate a second waveguide signal. The system includes one or more photodetectors to generate a first output signal within a first frequency range, and generate, based on the second waveguide signal and a second LO signal, a second output signal within a second frequency range. The system includes an optical frequency shifter (OFS) to shift a frequency of the second LO signal to cause the second output signal to shift from within the second frequency range to within the first frequency range to generate a shifted signal. The system includes a processor to receive the shifted signal to produce one or more points in a point set.

15 Claims, 7 Drawing Sheets

FMCW LIDAR USING ARRAY WAVEGUIDE RECEIVERS AND OPTICAL FREQUENCY SHIFTING

TECHNICAL FIELD

The present disclosure relates generally to optical detection, and more particularly to systems and methods for using array waveguide receivers and optical frequency shifting in a frequency-modulated continuous wave (FMCW) light detection and ranging (LIDAR) system to enhance detection of distant objects.

BACKGROUND

A LIDAR system includes an optical scanner to transmit an FMCW infrared (IR) optical beam and to receive a return signal from reflections of the optical beam; an optical processing system coupled with the optical scanner to generate a baseband signal in the time domain from the return signal, where the baseband signal includes frequencies corresponding to LIDAR target ranges; and a signal processing system coupled with the optical processing system to measure energy of the baseband signal in the frequency domain, to compare the energy to an estimate of LIDAR system noise, and to determine a likelihood that a signal peak in the frequency domain indicates a detected target.

SUMMARY

One aspect disclosed herein is directed to a system of array waveguide receivers and optical frequency shifting in a frequency-modulated continuous wave (FMCW) light detection and ranging (LIDAR) system to enhance detection of distant objects. In some embodiments, the system includes one or more waveguides, responsive to a transmission of a plurality of optical beams towards at least one target, to receive a first returned reflection having a first lag angle, and generate a first waveguide signal based on the first returned reflection, receive a second returned reflection having a second lag angle different from the first lag angle, and generate a second waveguide signal based on the second returned reflection. In some embodiments, the system includes one or more photodetectors to: generate, based on the first waveguide signal and a first local oscillator (LO) signal, a first output signal within a first frequency range; and generate, based on the second waveguide signal and a second LO signal, a second output signal within a second frequency range. In some embodiments, the system includes an optical frequency shifter (OFS) to shift a frequency of the second LO signal to cause the second output signal to shift from within the second frequency range to within the first frequency range to generate a shifted signal. In some embodiments, the system includes a processor, coupled to memory, to receive the shifted signal to produce one or more points in a point set.

In another aspect, the present disclosure is directed to a method for using array waveguide receivers and optical frequency shifting in an FMCW LIDAR system to enhance detection of distant objects. In some embodiments, the method includes receiving, responsive to a transmission of a plurality of optical beams into an environment, a first returned optical beam having a first lag angle. In some embodiments, the method includes generating a first waveguide signal based on the first returned optical beam. In some embodiments, the method includes receiving, responsive to the transmission of a plurality of optical beams into an environment, a second returned optical beam having a second lag angle. In some embodiments, the method includes generating a second waveguide signal based on the second returned optical beam. In some embodiments, the method includes generating, based on the first waveguide signal and a first local oscillator (LO) signal, a first output signal within a first frequency range. In some embodiments, the method includes generating, based on the second waveguide signal and a second LO signal, a second output signal within a second frequency range. In some embodiments, the method includes shifting a frequency of the second LO signal to cause the second output signal to shift from within the second frequency range to within the first frequency range to generate a shifted signal. In some embodiments, the method includes receiving the shifted signal to produce one or more points in a point set.

In another aspect, the present disclosure is directed to a system of array waveguide receivers and optical frequency shifting in a frequency-modulated continuous wave (FMCW) light detection and ranging (LIDAR) system to enhance detection of distant objects. In some embodiments, the system includes one or more waveguides, responsive to a transmission of a plurality of optical beams towards at least one target, to receive a first returned reflection to generate a first waveguide signal and receive a second returned reflection to generate a second waveguide signal. In some embodiments, the system includes one or more photodetectors to generate, based on the first waveguide signal and a first local oscillator (LO) signal, a first output signal within a first frequency range, and generate, based on the second waveguide signal and a second LO signal, a second output signal within a second frequency range. In some embodiments, the second frequency range is different from the first frequency range. In some embodiments, the system includes an optical frequency shifter (OFS) to shift a frequency of the second LO signal to cause the second output signal to shift from within the second frequency range to within the first frequency range to generate a shifted signal for receipt by a first analog-to-digital converter (ADC) from a plurality of different ADCs. In some embodiments, the first ADC is configured to process one or more signals within the first frequency range.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

Figure 6:
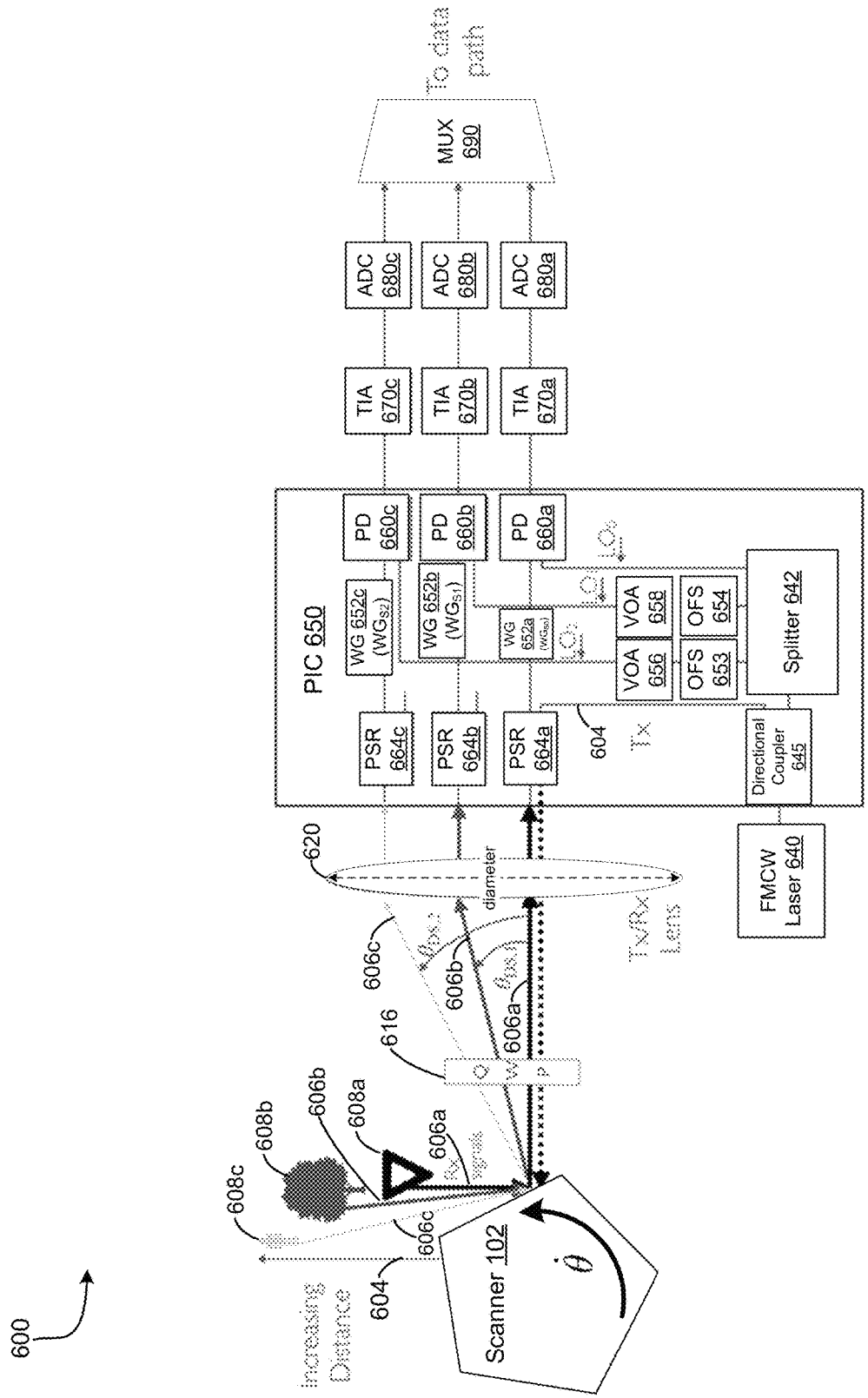
Figure 7:
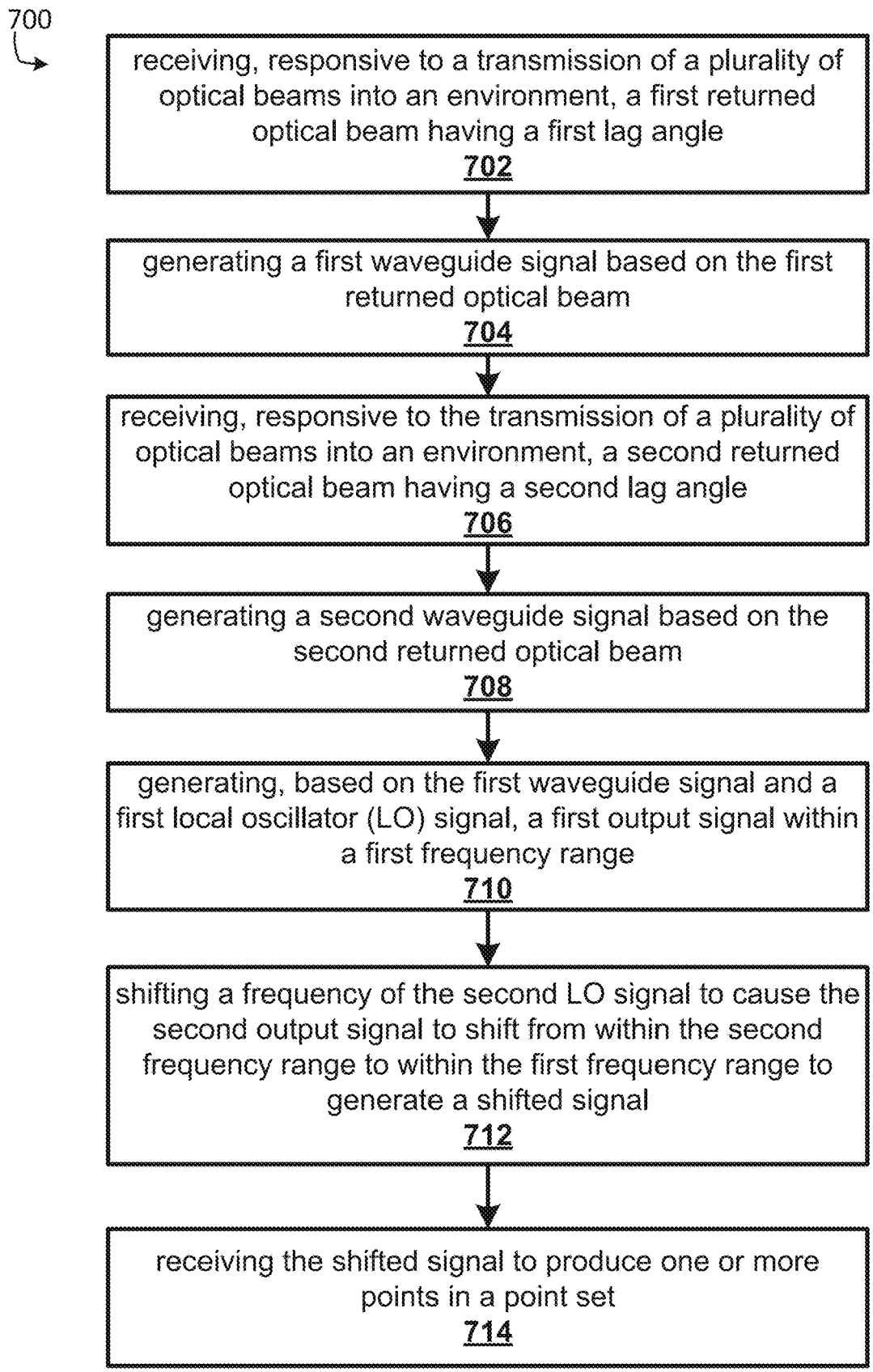

FIG. 6 is a block diagram illustrating an example environment for using AWRs and OFSs, and additionally, polarization splitter-rotator (PSRs) and/or variable optical attenuators (VOAs) in the LIDAR system 100 to enhance detection of distant objects, according to some embodiments; and FIG. 7 is a flow diagram illustrating an example method for using array waveguide receivers and optical frequency shifting in an FMCW LIDAR system to enhance detection of distant objects, according to some embodiments.

DETAILED DESCRIPTION

According to some embodiments, the described LIDAR system using an array waveguide receiver and optical frequency shifting (AWR/OFS) may be implemented in a variety of sensing and detection applications, such as, but not limited to, automotive, communications, consumer electronics, and healthcare markets. According to some embodiments, the described LIDAR system using AWR/OFS may be implemented as part of a front-end of frequency modulated continuous-wave (FMCW) device that assists with spatial awareness for automated driver assist systems, or self-driving vehicles. According to some embodiments, the AWR/OFS configuration may be agnostic to specific optical scanning architecture and can be tailored to enhance scanning LIDAR performance for a desired target range and/or to increase frame rate for a given range on the fly.

In a coherent LIDAR system, a frequency-modulated continuous wave (FMCW) transmitted light source (Tx) is used to determine the distance and velocity of objects in the scene by mixing a copy of the Tx source, known as the local oscillator (LO), with the received light (Rx) from the scene. The LO and Rx paths are combined on a fast photodiode (e.g., a photodetector), producing beat frequencies, proportional to object distance, which are processed electronically to reveal distance and velocity information of objects in the scene. To generate a point-cloud image, scanning optics are commonly used to deflect the Tx beam (e.g., signal) through the system field of view (FOV), comprising azimuth and zenith angles. In many applications, it is desirable to simultaneously achieve the highest possible scan rate and a large signal-to-noise ratio (SNR), as these two parameters directly affect the frame-rate of the LIDAR system, its maximum range (e.g., distance), range and velocity resolution, and the lateral spatial resolution.

However, increasing the scan rate produces a larger lag angle between the Rx light from a given object and the receive aperture (e.g., a lens) of the system. This lag angle effect creates a descan problem, where the Rx signals from distant objects are returned outside of the receive aperture, which reduces the SNR, as well as, limits the achievable scan/frame rate and maximum range of a scanning LIDAR systems. Furthermore, the detection of objects at large range produces large beat frequencies. Therefore, detecting distant objects with high fidelity requires the use of analog-to-digital convertors (ADCs) with very large sampling rates, approaching Giga-samples per second (Gsps), which consume a large amount of power.

Accordingly, the present disclosure addresses the above-noted and other deficiencies by disclosing systems and methods for using array waveguide receivers and optical frequency shifting in a frequency-modulated continuous wave (FMCW) light detection and ranging (LIDAR) system. As described in the below passages with respect to one or more embodiments, a LIDAR system may include an array waveguide receiver (AWR) and one or more optical frequency shifters (OFS) into a single device architecture, such as a photonic integrated circuit (PIC). The AWR includes a main optical axis waveguide and one or more displaced satellite waveguides for collecting Rx power from distant objects that would otherwise be lost due to the descan lag angle, which is proportional to scan rate and target distance. Frequency shifted local oscillator (LO) signals are combined with the Rx signals on the satellite waveguides to remap (e.g., down-convert, shift, adjust) the target beat frequencies to the radio frequency (RF) baseband. The combined effect is that the SNR (e.g., $SNR \propto P_{LO} P_{Rx}/BW_{ADC}$) of the LIDAR system can be drastically improved while concurrently reducing the ADC bandwidth and/or sampling requirements, and thus reducing the electrical power dissipation in the system.

The present disclosure includes several powerful and distinct techniques into a single device architecture (e.g., a PIC), which provides significant potential enhancements to maximum LIDAR range, velocity resolution, and framerate. The AWR and/or OFS subcomponents of the LIDAR system can be optimized to tailor these performance enhancements to different applications (e.g., long-range versus short-range detection).

Furthermore, the present disclosure introduces a new approach to improving range by binning (e.g., shifting, remapping) target ranges into a desired detection bandwidth. Enabled by an OFS configuration, binning the scene along the optical axis is unique to the disclosed system compared to conventional LIDAR systems.

Figure 1:
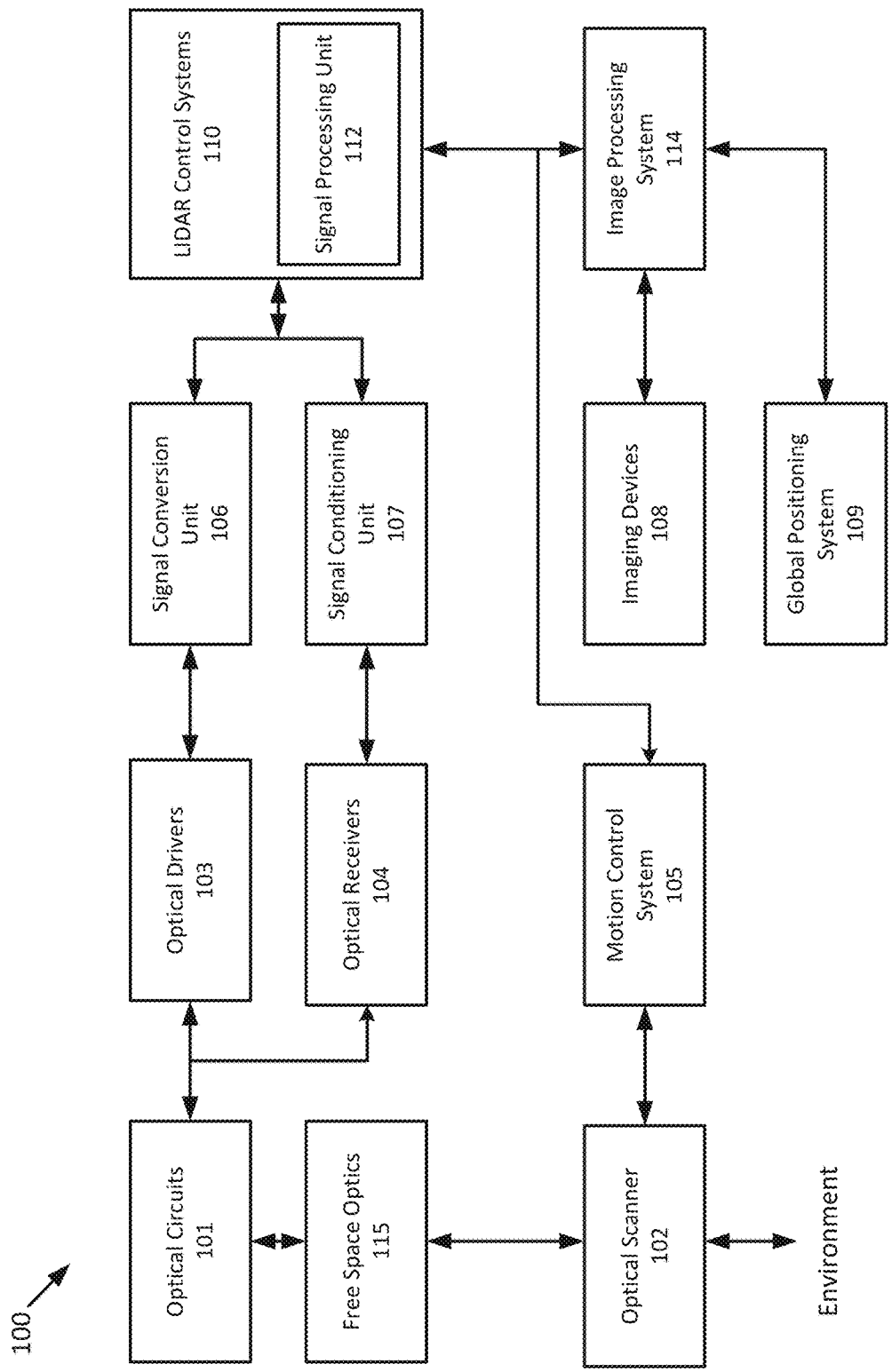
FIG. 1 is a block diagram illustrating an example of a LIDAR system, according to some embodiments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free space relative to the vehicle. In some embodiments, the vehicle may include a steering system and a braking system, each of which may work in combination with one or more LIDAR systems 100 according to any information (e.g., distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processing unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
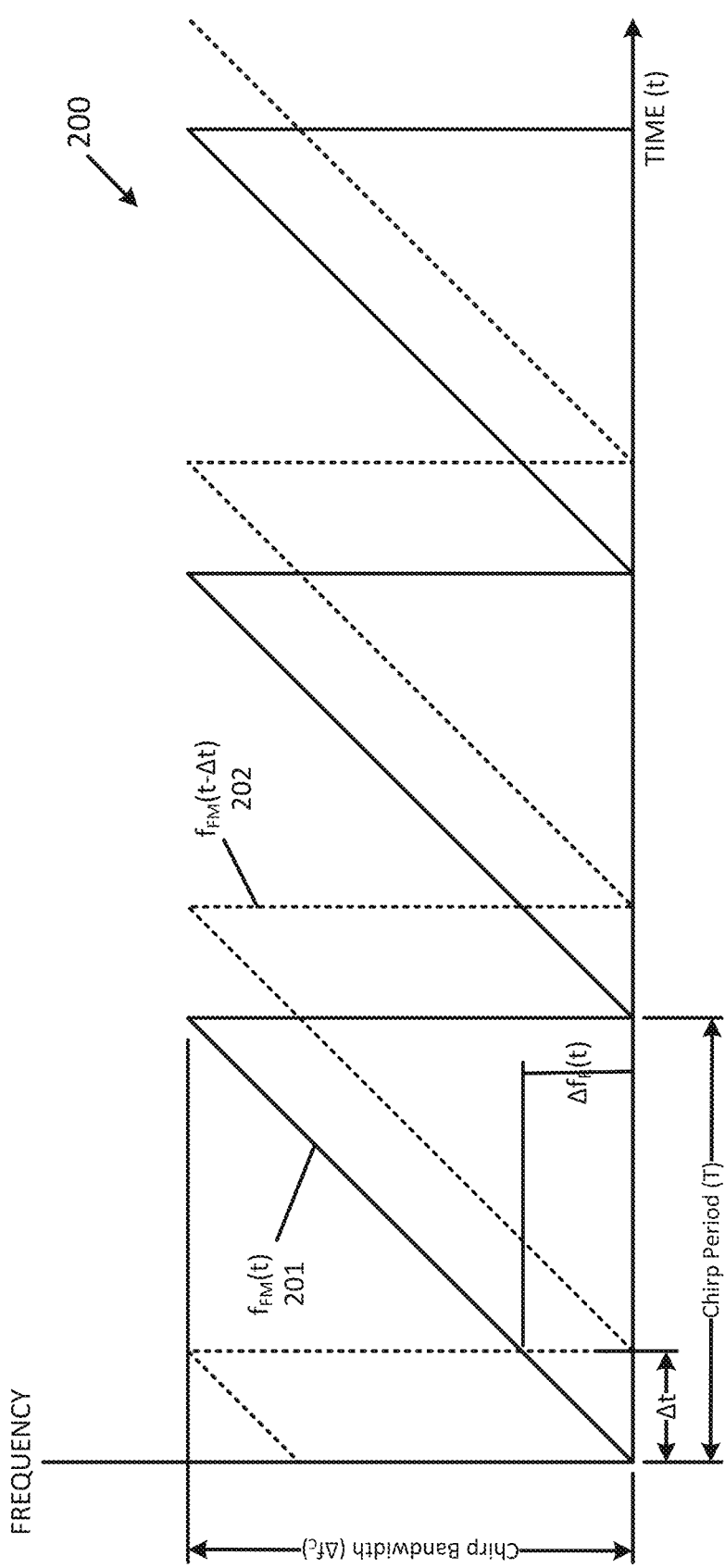
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning waveform 201, where $\Delta t$ is the round trip time to and from a target illuminated by scanning waveform 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
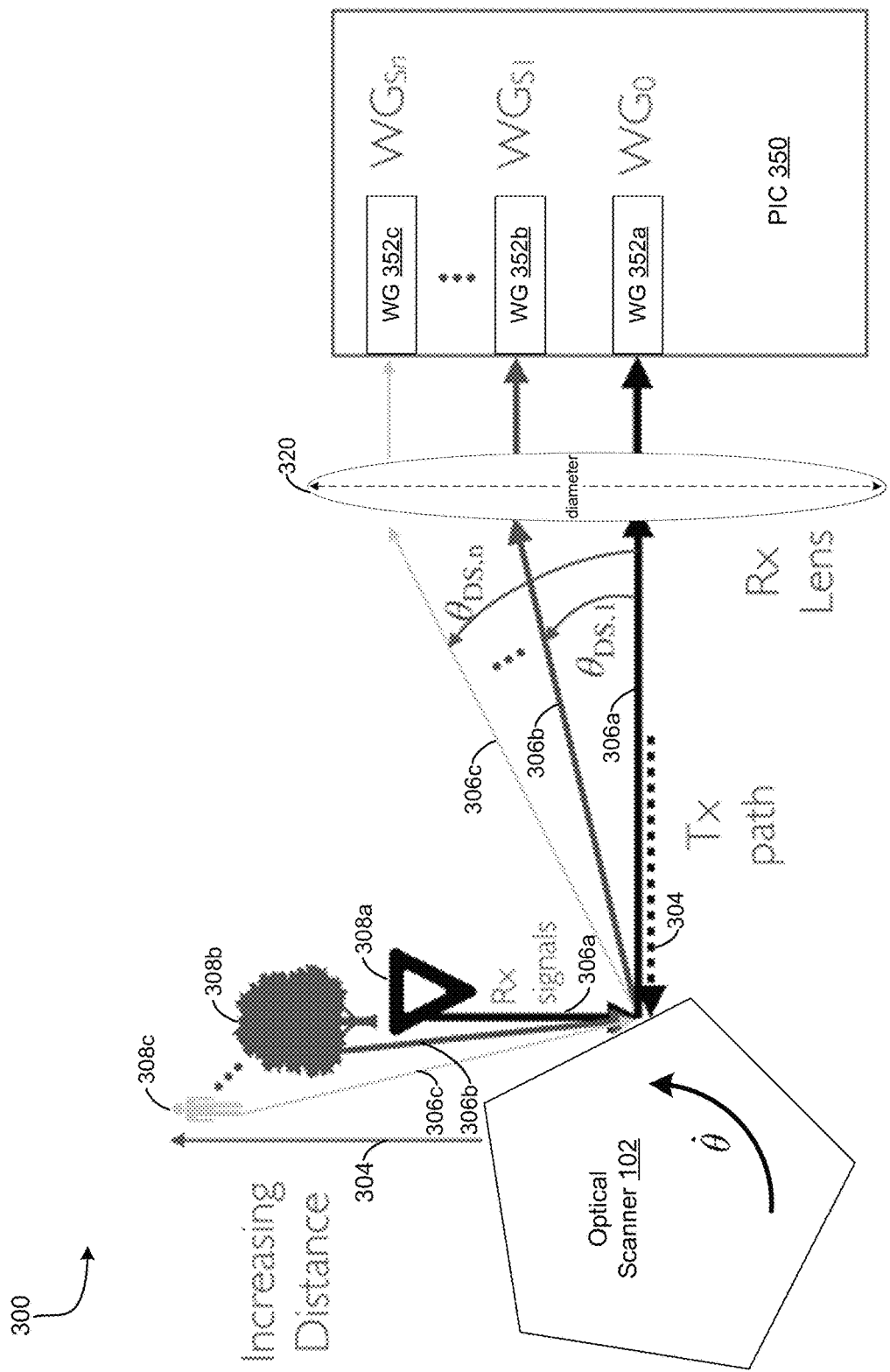
FIG. 3 is a block diagram illustrating an example environment for using array waveguide receivers (AWRs) in the LIDAR system 100 in FIG. 1 to enhance detection of distant objects, according to some embodiments.

FIG. 3 is a block diagram illustrating an example environment for using AWRs in the LIDAR system 100 in FIG. 1 to enhance detection of distant objects, according to some embodiments. The environment 300 includes the optical scanner 102 (e.g., a prism, a mirror), a lens (sometimes referred to as, "optical element"), and an array waveguide receiver (AWR) that is fabricated on a photonic integrated circuit (PIC) 350. In some embodiments, any of the components (e.g., lens 320, PIC 350 with AWRs, etc.) in the environment 300 may be added as a component of the LIDAR system 100 in FIG. 1, or be used to replace or modify any of the one or more components (e.g., free space optics 115, optical circuits, optical receivers 104, etc.) of the LIDAR system 100.

The environment 300 includes one or more objects, such as object 308a (e.g., a street sign), object 308b (e.g., a tree), and object 308c (e.g., a pedestrian); each collectively referred to as objects 308. Although FIG. 3 shows only a select number of objects 308, the environment 300 may include any number of objects 308 of any type (e.g., pedestrians, vehicles, street signs, raindrops, snow, street surface) that are within a short distance (e.g., 30 meters) or a long distance (e.g., 300 meters, 500 meters and beyond) from the optical scanner 102. In some embodiments, an object 308 may be stationary or moving with respect to the optical scanner 102.

In some embodiments, the optical scanner 102 is configured to receive one or more optical beams 304 from an optical beam source (not shown in FIG. 3). In some embodiments, the optical scanner 102 is configured to redirect (e.g., steer, transmit, scatter) the one or more optical beams 304 into free space toward the one or more objects 308, which causes the one or more optical beams to scatter into returned optical beams 306a, 306b, 306c (collectively referred to as, "returned optical beams 306"). For example, the one or more optical beams 304 scatter against the object 308a to create a returned optical beam 306a, which is returned to the LIDAR system 100. As another example, the one or more optical beams 304 scatter against the object 308b to create a returned optical beam 306b, which is returned to the LIDAR system 100. As another example, the one or more optical beams 304 scatter against the object 308c to create a returned optical beam 306c, which is returned to the LIDAR system 100.

The environment 300 includes a lens 320 (sometimes referred to as, "an optical element") for collecting (e.g., receiving, acquiring, aggregating) the returned optical beams 306 that scatter from the one or more objects 308 in response to the optical scanner 102 redirecting the one or more optical beams 304 into free space. In some embodiments, the lens 320 may be a symmetric lens having a diameter. In some embodiments, the lens 320 may be an asymmetric lens.

As shown in FIG. 3, the lag angle between a respective returned optical beam 306 and the lens 320 is indicated by $\theta_{DS,n}$, where n is an integer. For example, the lag angle between the returned optical beam 306a and the lens 320 is indicated by $\theta_{DS,0}$ (not shown in FIG. 3), the lag angle between the returned optical beam 306b and the lens 320 is indicated by $\theta_{DS,1}$, and the lag angle between the returned optical beam 306c and the lens 320 is indicated by $\theta_{DS,2}$ (shown in FIG. 3 as, $\theta_{DS,n}$). In some embodiments, increasing the scan rate of the optical scanner 102 produces a larger lag angle between one or more of the returned optical beams 306.

As shown in FIG. 3, the PIC 350 includes a set (e.g., one or more) of waveguides. The set of waveguides may include a primary on-axis waveguide (shown in FIG. 3 as, $WG_0$) and off-axis satellite waveguides (shown in FIG. 3 as, $WG_{S,n}$), which are positioned at a location in the PIC 350, for example, as expressed by the following Equation:

$$x_n = n \cdot p_{WGs} \qquad (1)$$

where: n is the waveguide number; and $p_{WGs}$ is the designed pitch. In some embodiments, other than being positioned at unique locations in the PIC 350, a primary waveguide and a satellite waveguide may be the same type of waveguide.

As shown in FIG. 3, PIC 350 includes waveguide (WG) 352a that is configured as the primary on-axis waveguide for receiving the return optical beam 306a via the lens 320 responsive to the optical scanner 102 transmitting the one or more optical beams 304 into free space. The PIC 350 (sometimes referred to as, "an optical receiver") includes waveguide (WG) 352b that is configured as an off-axis satellite waveguide for receiving the return optical beam 306b via the lens 320 responsive to the optical scanner 102 transmitting the one or more optical beams 304 into free space. The PIC 350 includes waveguide (WG) 352c that is configured as an off-axis satellite waveguide for receiving the return optical beam 306c via the lens 320 responsive to the optical scanner 102 transmitting the one or more optical beams 304 into free space.

Thus, a satellite waveguide may be configured (e.g., positioned, arranged, constructed) to serve as an additional Rx channel to collect a returned optical beam 306 (e.g., scattered light) that is received at a particular lag angle, for example, as expressed in the following Equation:

$$\theta_{DS} = 2R/c \cdot \dot{\theta} \qquad (2)$$

where: R is the target distance, c is the speed of light, and $\dot{\theta}$ is the azimuthal scan rate. In other words, one or more satellite waveguides may be positioned throughout the PIC 350 to allow a LIDAR system (e.g., LIDAR system 100) to receive returned optical beams 306 at increasing (e.g., large) values of lag angle.

In some embodiments, the returned optical beams 306 may have large lag angles that would otherwise be lost from the primary on-axis waveguide ($WG_0$) channel due to the finite size of the diameter of the lens 320 and/or the focal spot and de-scanned position of the returned optical beams 306, for example, as expressed in the following Equation:

$$x_{DS} = \theta_{DS} \cdot f_{Rx} \qquad (3)$$

where $f_{Rx}$ is the focal length of the lens 320.

Although not shown in FIG. 3, the PIC 350 couples to the LIDAR control system 110 in FIG. 1 such to be able to pass any of the optical beams that are received by any of the WGs 352 to the LIDAR control system 110 for processing by the signal processing unit 112.

Figure 4:
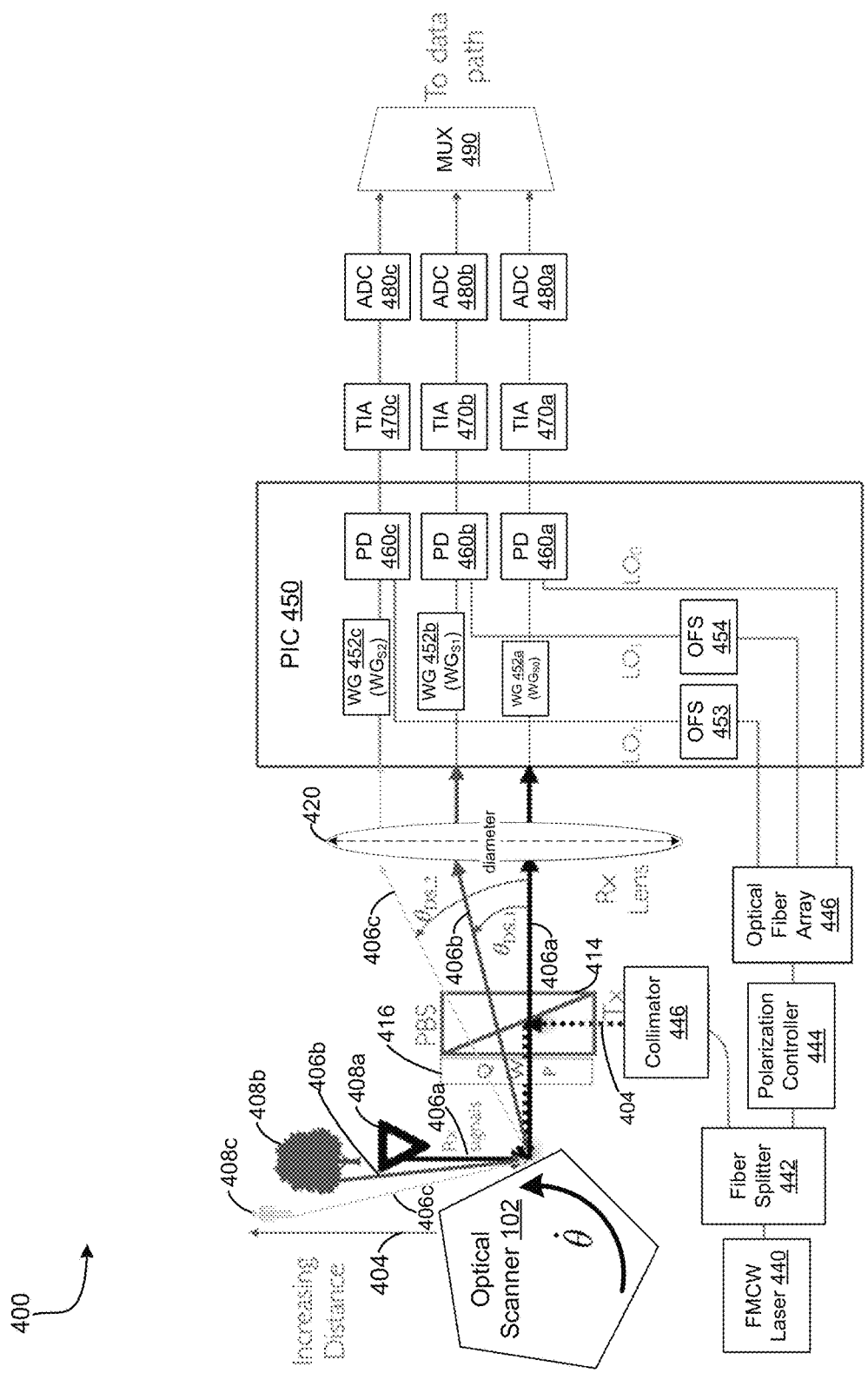
FIG. 4 is a block diagram illustrating an example environment for using AWRs and optical frequency shifters (OFS) in the LIDAR system 100 in FIG. 1 to enhance detection of distant objects, according to some embodiments.

FIG. 4 is a block diagram illustrating an example environment for using AWRs and optical frequency shifters (OFS) in the LIDAR system 100 in FIG. 1 to enhance detection of distant objects, according to some embodiments. The environment 400 includes the optical scanner 102, a polarizing beam splitter (PBS) 414, a quarter-wave plate (QWP) 416, a lens 420, an FMCW laser 440, a fiber splitter 442 (e.g., a 1×2 fiber splitter), a polarization controller 444, a collimator 446, an optical fiber array 446, and a PIC 450. The environment 400 includes transimpedance amplifiers 470a, 470b, 470c (collectively referred to as, "TIAs 470"). The environment 400 includes ADCs 480a, 480b, 480c (collectively referred to as, ADCs 480) and a multiplexer (shown in FIG. 4 as, "MUX 490").

The PIC 450 (sometimes referred to as, "an optical receiver") includes waveguide (WG) 452a that is configured as the primary on-axis waveguide for receiving the return optical beam 406a from the PBS 414 via the lens 420 responsive to the optical scanner 102 transmitting the one or more collimated optical beams 404 into free space. The PIC 450 includes waveguide (WG) 452b that is configured as an off-axis satellite waveguide for receiving the return optical beam 406b from the PBS 414 via the lens 420 responsive to the optical scanner 102 transmitting the one or more collimated optical beams 404 into free space. The PIC 450 includes waveguide (WG) 452c that is configured as an off-axis satellite waveguide for receiving the return optical beam 406c from the PBS 414 via the lens 420 responsive to the optical scanner 102 transmitting the one or more collimated optical beams 404 into free space. Although FIG. 4 shows that the PIC 450 includes only a select number of satellite waveguides (e.g., WG 452a, WG 452b, WG 452a), the PIC 450 may include any number of satellite waveguides to depending on desired performance and application.

The PIC 450 includes optical frequency shifters (OFS) 452, 454. The PIC 450 includes balanced photodiodes (PD) 460a, 460b, 460c (collectively referred to as, "PDs 460"). In some embodiments, the OFSs 453, 454 may be implemented using a variety of PIC architectures including a serrodyne Mach-Zehnder interferometer, a single-sideband modulator, an in-phase/quadrature (I/Q) optical modulator, or adaptations thereof.

In some embodiments, any of the components (e.g., PIC 450, fiber splitter 442, etc.) in the environment 400 may be added as a component of the LIDAR system 100 in FIG. 1, or be used to replace or modify any of the one or more components (e.g., free space optics 115, optical circuits, optical receivers 104, etc.) of the LIDAR system 100.

The environment 400 includes one or more objects, such as object 408a (e.g., a street sign), object 408b (e.g., a tree), and object 408c (e.g., a pedestrian); each collectively referred to as objects 408. Although FIG. 4 shows only a select number of objects 408, the environment 400 may include any number of objects 408 of any type that are within a short distance (e.g., 30 meters) or a long distance (e.g., 300 meters, 500 meters and beyond) from the optical scanner 102. In some embodiments, an object 408 may be stationary or moving with respect to the optical scanner 102.

An output terminal of the FMCW laser 440 is coupled to an input terminal of the fiber splitter 442. A first output terminal of the fiber splitter 442 is coupled to an input terminal of the collimator 446 and a second output terminal of the fiber splitter 442 is coupled to an input terminal of the polarization controller 444. The output terminal of the polarization controller 444 is coupled to an input terminal of the optical fiber array 446. A first output terminal of the optical fiber array 446 is coupled to an input terminal of the OFS 453, whose output terminal is coupled to a second input terminal of the PD 460c. A second output terminal of the optical fiber array 446 is coupled to an input terminal of the OFS 454, whose output terminal is coupled to a second input terminal of the PD 460b. A third output terminal of the optical fiber array 446 is coupled to a second input terminal of the PD 460a.

An output terminal of the WG 452c is coupled to a first input terminal of the PD 460c. An output terminal of the WG 452b is coupled to a first input terminal of the PD 460b. An output terminal of the WG 452a is coupled to a first input terminal of the PD 460a.

An output terminal of the PD 460c is coupled to an input terminal of the TIA 470c, whose output terminal is coupled to an input terminal of the ADC 480c, whose output terminal is coupled to a first input terminal of the MUX 490. An output terminal of the PD 460b is coupled to an input terminal of the TIA 470b, whose output terminal is coupled to an input terminal of the ADC 480b, whose output terminal is coupled to a first input terminal of the MUX 490. An output terminal of the PD 460a is coupled to an input terminal of the TIA 470a, whose output terminal is coupled to an input terminal of the ADC 480a, whose output terminal is coupled to a first input terminal of the MUX 490.

In some embodiments, the FMCW laser 440 is configured to generate and transmit an optical beam (e.g., light) to the fiber splitter 442, which is configured to split (e.g., divide, duplicate) the optical beam into a split optical beam to propagate along a Tx path and an LO signal (sometimes referred to as, "an LO beam") to propagate along an LO path. In some embodiments, the collimator 446 is configured to generate a collimated optical beam 404 using the split optical beam and the PBS 414 is configured to redirect the collimated optical beam 404 onto a main Tx/Rx path. In some embodiments, the QWP 416 is configured to convert the collimated optical beam 404—which is linearly polarized light—into circularly polarized light, which is then directed to free space (e.g., the scene) via the optical scanner 102.

In some embodiments, Rx signals (e.g., return optical beam 406a, return optical beam 406b, return optical beam 406c) are generated by the objects (e.g., objects 408a, 408b, 408c) in the scene and returned to the LIDAR system 100 with opposite circular polarization and an inherent $\theta_{DS}$ according to Equation. (2). In some embodiments, the QWP 416 is configured to convert each of the Rx beams to a linear polarization which passes through the PBS 414 and is focused onto a respective waveguide (e.g., WG 452a, WG 452b, WG 452c) using the lens 420. In some embodiments, light from the LO path of the fiber splitter 442 passes through a polarization controller 444 and is coupled onto separate LO paths on the PIC 450 using the optical fiber array 446.

In some embodiments, each satellite LO channel (e.g., the channels associated with WG 452b and WG 452c) is frequency shifted by a unique (e.g., different) amount, whereas the main channel (e.g., the channel associated with WG 452a) remains unshifted. For example, the OFS 453 is configured to frequency shift (and/or phase shift) the light that it receives from the polarization controller 444 by a first offset to generate an LO signal (shown in FIG. 4 as, "$LO_2$"). As another example, the OFS 454 is configured to frequency shift (and/or phase shift) the light that it receives from the polarization controller 444 by a second offset to generate a LO signal (shown in FIG. 4 as, "$LO_1$"). As another example, the light/LO signal (shown in FIG. 4 as, "$LO_0$") that is transmitted from the third terminal of the optical fiber array 446 is not shifted.

In some embodiments, some or all of the LO signals are mixed with an Rx signal on a waveguide (e.g., WG 452a, WG 452b, WG 452c), and passed onto a balanced photodiode (e.g., PD 460, PD 462, PD 464). In this approach, having a dedicated PD-TIA-ADC path for each waveguide channel allows a pristine signal to be produced without interference from other channels.

Although not shown in FIG. 4, the output of the MUX 490 couples to the LIDAR control system 110 in FIG. 1 such to be able to pass any of the optical beams that are received by any of the WGs 452 to the LIDAR control system 110 for processing by the signal processing unit 112.

Figure 5:
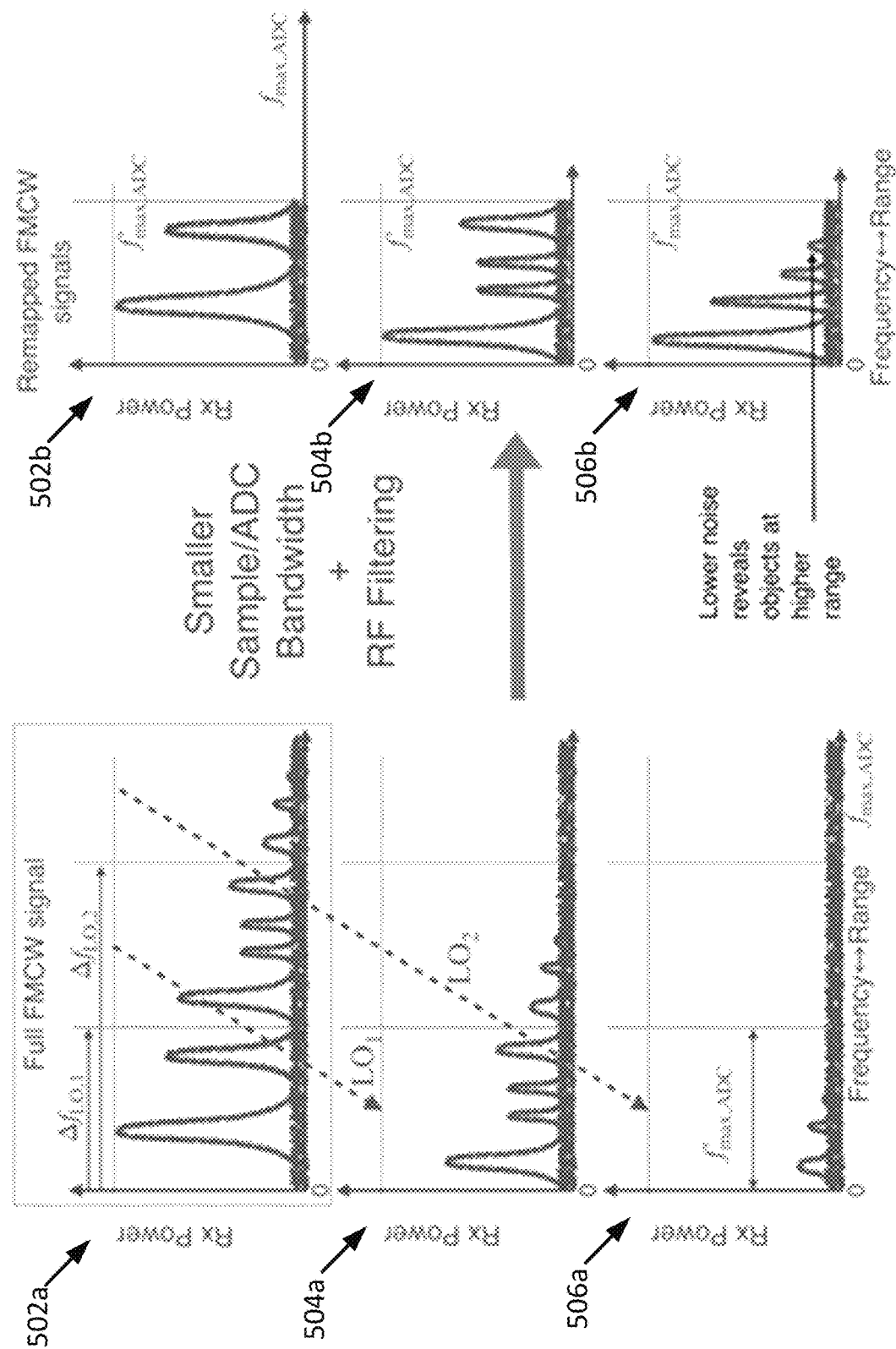
FIG. 5 is a series of graphs illustrating the effect of frequency remapping/shifting of the LO using OFSs in the LIDAR system 100 in FIG. 1 to enhance detection of distant objects, according to some embodiments.

FIG. 5 is a series of graphs illustrating the effect of frequency remapping/shifting of the LO using OFSs in the LIDAR system 100 in FIG. 1 to enhance detection of distant objects, according to some embodiments. The graph 502a shows an example FMCW signal that includes multiple objects with beat frequencies $f_{beat,i} = \gamma(\Delta\tau_i)$, where $\gamma$ is the FMCW chirp rate and $\Delta\tau_i \approx 2R/c$ is the target time delay. The full FMCW scan displays a characteristic reduction of the Rx power of target objects with increasing distance/beat frequency. As shown in graphs 502b, 504b, 506b, the detection range includes frequencies up to $f_{max,ADC}$, which for large distances can necessitate sampling rates of Giga-samples per second (Gsps). Such high sampling rates may result in high electrical power dissipation in an ADC (e.g., ADCs 480, ADCs 580) and increase system cost. As shown in graphs 504a and 506a, applying a frequency shift $\Delta f_{LO,n}$ to the LOs (e.g., $LO_1$ and $LO_2$) may have the effect of mapping target frequencies to $f_{beat,i}=f_{beat,i}-\Delta f_{LO,n}$. In some embodiments, for a given choice of $\Delta f_{LO,n}$, a desired target range may be mapped to the RF baseband (e.g., zero frequency), thereby allowing distant targets to be captured at low frequency.

This remapping/shifting scheme has the advantage of reducing the required bandwidth of the ADCs ($BW_{ADC}$) in a LIDAR system using the optical frequency shifters (OFS) in environment 400 in FIG. 4 and the environment 500 in FIG. 5. Combined with the increased Rx power ($P_{Rx}$), a descan-tolerant AWR+OFS LIDAR architecture (as depicted in environment 400 in FIG. 4 and environment 500 in FIG. 5) can significantly enhance the SNR of distant objects via $SNR \propto P_{LO}P_{Rx}/BW_{ADC}$, reduce power consumption and cost, enable large scan/frame rates, and provide a unique distance binning approach that is inaccessible in the conventional LIDAR system.

FIG. 6 is a block diagram illustrating an example environment for using AWRs and OFSs, and additionally, polarization splitter-rotator (PSRs) and/or variable optical attenuators (VOAs) in the LIDAR system 100 to enhance detection of distant objects, according to some embodiments. The environment 600 includes the optical scanner 102, a quarter-wave plate (QWP) 616, a lens 620, an FMCW laser 640, and a photonic integrated circuit (PIC) 450. The environment 400 includes transimpedance amplifiers 670a, 670b, 670c (collectively referred to as, "TIAs 670"). The environment 600 includes ADCs 680a, 680b, 680c (collectively referred to as, ADCs 680) and a multiplexer (shown in FIG. 4 as, "MUX 690").

The PIC 650 (sometimes referred to as, "an optical receiver") includes a polarization splitter-rotator (PSR) 664a that is configured to receive the return optical beam 606a from the QWP 616 via the lens 620 responsive to the optical scanner 102 transmitting the one or more optical beams 604 into free space. The PIC 650 includes a PSR 664b that is configured to receive the return optical beam 606b from the QWP 616 via the lens 620 responsive to the optical scanner 102 transmitting the one or more optical beams 604 into free space. The PIC 650 includes a PSR 664c that is configured to receive the return optical beam 606c from the QWP 616 via the lens 620 responsive to the optical scanner 102 transmitting the one or more optical beams 604 into free space.

The PIC 650 includes waveguide (WG) 652a that is configured as the primary on-axis waveguide for receiving the return optical beam 606a from the PSR 664a. The PIC 650 includes waveguide (WG) 652b that is configured as an off-axis satellite waveguide for receiving the return optical beam 606b from the PSR 664b. The PIC 650 includes waveguide (WG) 652c that is configured as an off-axis satellite waveguide for receiving the return optical beam 606c from the PSR 664c. Although FIG. 6 shows that the PIC 650 includes only a select number of satellite waveguides (e.g., WG 652a, WG 652b, WG 652a), the PIC 650 may include any number of satellite waveguides to depending on desired performance and application.

The PIC 650 includes a directional coupler 645 and a splitter 642. The PIC 650 includes optical frequency shifters (OFSs) 652, 654. The PIC 650 includes variable optical attenuators (VOAs) 656, 658. The PIC 650 includes balanced photodiodes (PD) 660a, 660b, 660c (collectively referred to as, "PDs 660"). In some embodiments, the OFSs 653, 654 may be implemented using a variety of PIC architectures including a serrodyne Mach-Zehnder interferometer, a single-sideband modulator, an in-phase/quadrature (I/Q) optical modulator, or adaptations thereof.

In some embodiments, any of the components (e.g., PIC 650 or any of the components of PIC 650, etc.) in the environment 600 may be added as a component of the LIDAR system 100 in FIG. 1, or be used to replace or modify any of the one or more components (e.g., free space optics 115, optical circuits, optical receivers 104, etc.) of the LIDAR system 100. As shown in FIG. 6, the Tx and Rx paths are contained within the same PIC architecture.

The environment 600 includes one or more objects, such as object 608a (e.g., a street sign), object 608b (e.g., a tree), and object 608c (e.g., a pedestrian); each collectively referred to as objects 608. Although FIG. 4 shows only a select number of objects 608, the environment 600 may include any number of objects 608 of any type that are within a short distance (e.g., 30 meters) or a long distance (e.g., 300 meters, 500 meters and beyond) from the optical scanner 102. In some embodiments, an object 608 may be stationary or moving with respect to the optical scanner 102.

An output terminal of the FMCW laser 640 is coupled to an input terminal of the directional coupler 645. A first output terminal of the directional coupler 645 is coupled to a second input terminal of the PSR 664a and a second output terminal of the directional coupler 645 is coupled to an input terminal of the fiber splitter 642.

A first output terminal of the fiber splitter 642 is coupled to an input terminal of the OFS 653, whose output terminal is coupled to an input terminal of the VOA 656, whose output terminal is coupled to a second terminal of the PD 660c. A second output terminal of the fiber splitter 642 is coupled to an input terminal of the OFS 654, whose output terminal is coupled to an input terminal of the VOA 658, whose output terminal is coupled to a second terminal of the PD 660b. A third output terminal of the fiber splitter 642 is coupled to a second terminal of the PD 660a.

An input terminal of the WG 652c is coupled to an output terminal of the PSR 664c and an output terminal of the WG 652c is coupled to a first input terminal of the PD 660c. An output terminal of the PD 660c is coupled to an input terminal of the TIA 670c, whose output terminal is coupled to an input terminal of the ADC 680c, whose output terminal is coupled to a first input terminal of the MUX 690.

An input terminal of the WG 652b is coupled to an output terminal of the PSR 664b and an output terminal of the WG 652b is coupled to a first input terminal of the PD 660b. An output terminal of the PD 660b is coupled to an input terminal of the TIA 670b, whose output terminal is coupled to an input terminal of the ADC 680b, whose output terminal is coupled to a second input terminal of the MUX 690.

An input terminal of the WG 652a is coupled to an output terminal of the PSR 664a and an output terminal of the WG 652a is coupled to a first input terminal of the PD 660a. An output terminal of the PD 660a is coupled to an input terminal of the TIA 670a, whose output terminal is coupled to an input terminal of the ADC 680a, whose output terminal is coupled to a third input terminal of the MUX 690.

In some embodiments, the FMCW laser 640 is configured to generate and transmit an optical beam (e.g., light) to the directional coupler 645, which is configured to separate (e.g., split, divide, duplicate) the optical beam into an optical beam (e.g., Tx path) 604 and an LO signal (sometimes referred to as, "an LO beam").

As discussed herein, each channel of the AWR in PIC 650 may have a respective PSR (e.g., PSR 664a, PSR 664b, PSR 664c). For the primary on-axis waveguide (e.g., WG 652a), the PSR 664a passes the Tx light onto the lens 620 and the QWP 616. The PSRs 664 on each channel are configured to receive oppositely polarized light from objects and convert the received light to the same polarization as Tx for mixing on the balanced PDs 660. In some embodiments, the same LO branch and procedure may be used with the addition of the VOAs 656, 658 that are placed on the satellite channels. In some embodiments, the VOAs 656, 658 are configured to balance the LO and Rx power to maximize fringe visibility on the PDs 660. The embodiment depicted in environment 600 is more compact and requires fewer optical alignments compared to external Tx paths, while generating the same performance benefits.

Although not shown in FIG. 6, the output of the MUX 690 couples to the LIDAR control system 110 in FIG. 1 such to be able to pass any of the optical beams that are received by any of the WGs 652 to the LIDAR control system 110 for processing by the signal processing unit 112.

In some embodiments, the described LIDAR system using an array waveguide receiver and optical frequency shifting (AWR/OFS) is agnostic to the optical scanning architecture, and thus the scheme is applicable to any mechanical approaches (e.g., galvanometer or hexagon systems). In some embodiments, the distance binning approach using AWR/OFS may be implemented in electrically driven optical phased arrays (e.g., distinct from wavelength-scan OPAs), whereby the exit/entrance aperture is defined by an array of emitters (e.g., grating couplers). In some embodiments, the frequency shift may be applied to a Tx signal (e.g., optical beam 304, optical beam 404, beams 504) rather than the LO paths to achieve the same effect. In some embodiments, a continuous wave (CW) laser maybe coupled onto the PIC (e.g., PIC 350, PIC 450, PIC 650) and the optical frequency shifters in a more complex manner, such as generating both the FMCW scan (e.g., triangle wave, sawtooth wave, etc.) and the single-frequency LO shifts on chip.

FIG. 7 is a flow diagram illustrating an example method for using array waveguide receivers and optical frequency shifting in an FMCW LIDAR system to enhance detection of distant objects. Additional, fewer, or different operations may be performed in the method depending on the particular arrangement. In some embodiments, some or all operations of method 700 may be performed by one or more processors executing on one or more computing devices, systems, or servers (e.g., remote/networked servers or local servers). In some embodiments, method 700 may be performed by a signal processing unit, such as signal processing unit 112 in FIG. 1. In some embodiments, method 700 may be performed by any of the components (e.g., scanner 102, PIC 350, etc.) in environment 300 in FIG. 3. In some embodiments, method 700 may be performed by any of the components (e.g., scanner 102, PIC 450, etc.) in environment 400 in FIG. 4. In some embodiments, method 700 may be performed by any of the components (e.g., scanner 102, PIC 650, etc.) in environment 600 in FIG. 6. Each operation may be re-ordered, added, removed, or repeated.

In some embodiments, the method 700 may include the operation 702 of receiving, responsive to a transmission of a plurality of optical beams into an environment, a first returned optical beam having a first lag angle. In some embodiments, the method 700 may include the operation 704 of generating a first waveguide signal based on the first returned optical beam. In some embodiments, the method 700 may include the operation 706 of receiving, responsive to the transmission of a plurality of optical beams into an environment, a second returned optical beam having a second lag angle.

In some embodiments, the method 700 may include the operation 708 of generating a second waveguide signal based on the second returned optical beam. In some embodiments, the method 700 may include the operation 710 of generating, based on the first waveguide signal and a first local oscillator (LO) signal, a first output signal within a first frequency range.

In some embodiments, the method 700 may include the operation 712 of shifting a frequency of the second LO signal to cause the second output signal to shift from within the second frequency range to within the first frequency range to generate a shifted signal. In some embodiments, the method 700 may include the operation 712 of receiving the shifted signal to produce one or more points in a point set.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
   an optical scanner to perform a transmission of a plurality of optical beams towards at least one target based on a transmit optical beam;
   one or more quarter-wave plates (QWPs), responsive to the transmission of the plurality of optical beams, to:
      receive, via a transmit/receive (Tx/Rx) path, a first returned reflection having a first lag angle and a second returned reflection having a second lag angle different from the first lag angle; and
      convert the first returned reflection and the second returned reflection from each having a circular polarization to each having a linear polarization;
   a first polarization splitter-rotator (PSR) to:
      receive the first returned reflection from the one or more QWPs and convert a polarization of the first returned reflection to generate a converted first returned reflection that matches a polarization of the first LO signal associated with the transmit optical beam;
      receive, via a Tx path, the transmit optical beam; and
      direct the transmit optical beam from the Tx path onto the Tx/Rx path and toward the one or more QWPs;
   a second PSR to receive the second returned reflection from the one or more QWPs and convert a polarization of the second returned reflection to generate a converted second returned reflection that matches a polarization of the second LO signal associated with the transmit optical beam;
   one or more waveguides to:
      receive the first returned reflection from the first PSR, and generate a first waveguide signal based on the first returned reflection;
      receive a second returned reflection from the second PSR, and generate a second waveguide signal based on the second returned reflection;
   one or more photodetectors to:
      generate, based on the first waveguide signal and a first local oscillator (LO) signal, a first output signal within a first frequency range; and
      generate, based on the second waveguide signal and a second LO signal, a second output signal within a second frequency range;
   an optical frequency shifter (OFS) to shift a frequency of the second LO signal to cause the second output signal to shift from within the second frequency range to within the first frequency range to generate a shifted signal; and
   a processor, coupled to memory, to:
      receive the shifted signal to produce one or more points in a point set.

2. The system of claim 1, wherein the second LO signal causes a reduction of at least one of a bandwidth requirement or a sampling rate requirement for an analog-to-digital converter (ADC) to process the shifted signal.

3. The system of claim 1, further comprising a quarter-wave plate (QWP) to:
   receive, via a transmit/receive (Tx/Rx) path, the transmit optical beam;
   convert the transmit optical beam from a linear polarization to a circular polarization to produce a circular polarized optical beam; and
   provide, via the Tx/Rx path, the circular polarized optical beam to the optical scanner.

4. The system of claim 1, further comprising a polarized beam splitter (PBS) to:
   receive, via a Tx path, the transmit optical beam; and
   direct the transmit optical beam from the Tx path onto the Tx/Rx path and toward the QWP.

5. The system of claim 1, further comprising:
   an optical beam source to generate the transmit optical beam;
   a collimator to narrow the transmit optical beam to produce a narrowed transmit optical beam, and provide, via the Tx path, the narrowed transmit optical beam to the PBS; and
   a controller to:
      receive an LO signal associated with the narrowed transmit optical beam,
      adjust a polarization state of the LO signal to produce an adjusted LO signal, and
      provide the adjusted LO signal to the one or more waveguides.

6. The system of claim 1, further comprising a polarized beam splitter (PBS) to:
   receive, from the QWP, the plurality of returned optical beams each comprising a circular polarization; and
   direct the plurality of returned optical beams toward the optical element.

7. The system of claim 1, further comprising a variable optical attenuator (VOA) to:
receive the shifted LO signal from the OFS;
adjust a power level of the shifted LO signal based on a power level of the second waveguide signal to produce an adjusted LO signal; and
provide the adjusted LO signal to the one or more photodetectors.

8. The system of claim 7, wherein the optical receiver further comprises:
a directional coupler to receive the transmit optical beam from an optical beam source, and generate an LO signal based on the transmit optical beam; and
a signal splitter to split the LO signal into the first LO signal and the second LO signal, and provide the first LO signal and the second LO signal to the one or more photodetectors.

9. The system of claim 1, wherein the OFS is further to:
frequency shift the second LO signal to cause the one or more photodetectors to generate the second output signal as a baseband signal.

10. The system of claim 1, further comprising a first analog-to-digital converter (ADC) and a second ADC, wherein the optical receiver is further to:
provide the first output signal to the first ADC to cause the first ADC to generate a first ADC output based on the first output signal; and
provide the second output signal to the second ADC to cause the second ADC to generate a second ADC output based on the second output signal.

11. The system of claim 10, wherein the OFS is further to:
frequency shift the second LO signal to reduce at least one of a bandwidth requirement or a sampling rate requirement for the second ADC to generate the second output signal.

12. The system of claim 1, wherein the one or more waveguides and the OFS are each deposed on a photonic integrated circuit (PIC).

13. The system of claim 1, further comprising:
a first waveguide of the one or more waveguides in a first position, the first waveguide to receive the first returned optical beam, and generate the first waveguide signal based on the first returned reflection; and
a second waveguide of the one or more waveguides in a second position, the second waveguide to receive the second reflection, and generate the second waveguide signal based on the second returned reflection, wherein the first position prevents the first waveguide from receiving the second returned reflection.

14. A method comprising:
performing a transmission of a plurality of optical beams towards at least one target based on a transmit optical beam;
receiving, by one or more quarter-wave plates (QWPs) via a transmit/receive (Tx/Rx) path responsive to the transmission of the plurality of optical beams, a first returned reflection having a first lag angle and a second returned reflection having a second lag angle different from the first lag angle;
converting the first returned reflection and the second returned reflection from each having a circular polarization to each having a linear polarization;
receiving, by a first polarization splitter-rotator (PSR), the first returned reflection from the one or more QWPs;
converting, by the first PSR, a polarization of the first returned reflection to generate a converted first returned reflection that matches a polarization of the first LO signal associated with the transmit optical beam;
receiving, by the first PSR, via a Tx path, the transmit optical beam;
directing, by the first PSR, the transmit optical beam from the Tx path onto the Tx/Rx path and toward the one or more QWPs;
receiving the second returned reflection from the one or more QWPs;
converting a polarization of the second returned reflection to generate a converted second returned reflection that matches a polarization of the second LO signal associated with the transmit optical beam;
receiving, by one or more waveguides, the first returned optical beam from the first PSR,
generating, by one or more waveguides, a first waveguide signal based on the first returned optical beam;
receiving, by the one or more waveguides, a second returned optical beam from the second PSR,
generating a second waveguide signal based on the second returned optical beam;
generating, based on the first waveguide signal and a first local oscillator (LO) signal, a first output signal within a first frequency range;
generating, based on the second waveguide signal and a second LO signal, a second output signal within a second frequency range;
shifting a frequency of the second LO signal to cause the second output signal to shift from within the second frequency range to within the first frequency range to generate a shifted signal; and
receiving the shifted signal to produce one or more points in a point set.

15. A system comprising;
an optical scanner to perform a transmission of a plurality of optical beams towards at least one target based on a transmit optical beam;
one or more quarter-wave plates (QWPs), responsive to the transmission of the plurality of optical beams, to:
receive, via a transmit/receive (Tx/Rx) path, a first returned reflection having a first lag angle and a second returned reflection having a second lag angle different from the first lag angle; and
convert the first returned reflection and the second returned reflection from each having a circular polarization to each having a linear polarization;
a first polarization splitter-rotator (PSR) to:
receive the first returned reflection from the one or more QWPs and convert a polarization of the first returned reflection to generate a converted first returned reflection that matches a polarization of the first LO signal associated with the transmit optical beam;
receive, via a Tx path, the transmit optical beam; and
direct the transmit optical beam from the Tx path onto the Tx/Rx path and toward the one or more QWPs;
a second PSR to receive the second returned reflection from the one or more QWPs and convert a polarization of the second returned reflection to generate a converted second returned reflection that matches a polarization of the second LO signal associated with the transmit optical beam;
one or more waveguides to:
receive, from the first PSR, the first returned reflection to generate a first waveguide signal;
receive, from the second PSR, a second returned reflection to generate a second waveguide signal;

one or more photodetectors to:
- generate, based on the first waveguide signal and a first local oscillator (LO) signal, a first output signal within a first frequency range; and
- generate, based on the second waveguide signal and a second LO signal, a second output signal within a second frequency range, wherein the second frequency range is different from the first frequency range; and an optical frequency shifter (OFS) to shift a frequency of the second LO signal to cause the second output signal to shift from within the second frequency range to within the first frequency range to generate a shifted signal for receipt by a first analog-to-digital converter (ADC) from a plurality of different ADCs, wherein the first ADC is configured to process one or more signals within the first frequency range.

* * * * *